United States Patent Office 3,199,987
Patented Aug. 10, 1965

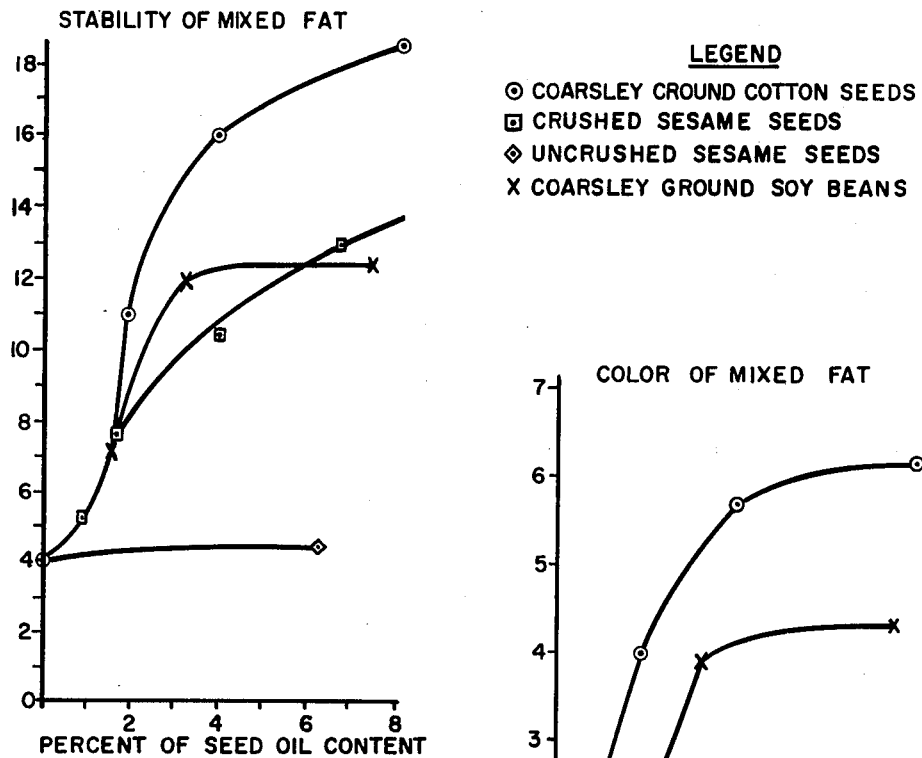
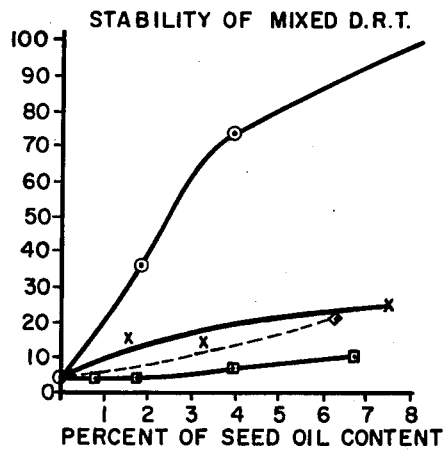
FIG.1.
FIG.2.
FIG.3.
INVENTOR
John E. Thompson

3,199,987
PROCESS FOR RENDERING FATTY MATERIALS
John E. Thompson, P.O. Box 2023, Chicago, Ill.
Filed Apr. 27, 1961, Ser. No. 106,018
7 Claims. (Cl. 99—118)

The present invention relates to a process for the rendering of fats and oils containing solids, and more in particular to the simultaneous rendering of vegetable and animal fats and oils.

Heretofore, it has been the practice to render animal fats by means of heat, to separate the fat from the solid materials contained therein. The solid materials are removed from the fats as dry rendered tankage.

Also, heretofore, it has been proposed to add finely ground soy bean flour (after the removal of the oil) to stabilize the lard and to heat the same to a temperature preferably within the range of 300 to 400° F., so as to char the soy bean flour and then remove the char by filtration. This is not a rendering process for the removal of the oil from the oil bearing seed.

It has also been the practice to remove the oily constituents from certain vegetable seeds, such as soy beans, cotton seeds, etc., and these vegetable oils have found extensive use in the preparation of shortening. It has also been the practice to blend a vegetable oil with an animal fat to give a shortening.

It is an object of the present invention to simultaneously render materials of animal origin containing fats, and to also render, at the same time, certain oil containing seeds to produce a mixed fatty material that has superior qualities as a shortening.

The various features of novelty which characterize this invention are pointed out with particularity in the claims annexed to and forming part of the specification. For a better understanding of the invention, however, its advantages and specific objects obtained by its use, reference should be had to the descriptive matter in which is illustrated and described a preferred embodiment of the invention.

While heretofore it has been customary to render animal fatty materials to separate the fat therefrom and to remove the oil from the oil bearing seeds, such as cotton seeds or soy beans, and then to blend these fats and oils into a shortening, it has been found possible to simultaneously render both vegetable oils and animal fats so as to produce a shortening of superior quality and at the same time remove therefrom the protein bearing products, dry rendered tankage, to be used as an animal feed.

More specifically it has been found possible to treat animal fatty materials in the same manner as is necessary to produce lard, and at the same time to supply to the rendering tank a quantity of oil seeds and to heat this combination to such a temperature that the oil is removed from the seeds and the fat is removed from the animal material. The fat is withdrawn from the solid protein material remaining and presents a blend of vegetable oils and animal fats.

The jointly rendered fatty product is not the same as a blend of similar amounts of vegetable oils with animal fats. The present invention produces a new product with superior qualities than those heretofore produced.

A shortening is obtained by simultaneously rendering animal fats and a quantity of vegetable seeds to give a mixed fatty material by a simultaneous rendering process. The mixed fatty material and the dry rendered tankage possesses certain beneficial properties, particularly an increased stability.

The seeds are suitably prepared by coarse grinding, rolling or crushing and then mixed with the animal fat in an amount proportional to the oil contents of the seeds to produce an indicated proportion of the vegetable oil in the final product, as shown in the following table.

The charge is prepared as follows: the oil content of the seed is determined and then the charge is computed using the following formula:

Percent $$\frac{W_o Y_o}{(W_f Y_f) + (W_o Y_o)} \times 100$$

where:

$W$ = weight
$Y$ = analytical content of oil or fat
$o$ = reference to oil seed, subscript
$f$ = reference to animal fat, subscript It is preferred to grind the oil seeds before rendering because more beneficial results are obtained when the seed hull is broken. The rendering was performed according to the usual production procedure, which is, placing in a steam heated kettle, a quantity of the fats to be rendered and heating until the moisture content has reached a range of 6% to 12% (based on the finished meal analysis), which will allow the pressure in either a screw press or a hydraulic press to obtain the maximum separation of the fat from the solid content.

Stability of the fats and the dry rendered tankage may be determined by the standard oxygen bomb method, using 100 p.s.i. and 50 p.s.i. oxygen pressures respectively. The color of the product obtained may be determined by measuring the optical density at 525 $\mu$ and converting this to Lovibond red color index.

In the normal production of lard from hog fat, rendering kettles are used. In the experiments listed in the following table, these usual production kettles were used and the products obtained from the mixed charge, that is, the mixed fats and the dry rendered tankage, normal or special dry rendered tankage as the case may be, were compared to the products obtained from the previous run with a charge of straight hog fat in the particular kettle used in rendering the mixed fat and oil.

TABLE

| Oil Bearing Seeds | Mixed Fat | | | Dry Rendered Tankage |
|---|---|---|---|---|
| | Percent Oil Content | Stability, OBM, hours | Color, L.R. | Stability, OBM, hours |
| Coarsely Ground Cotton Seeds. | 0 | 4 | 1.00 | 3 |
| | 1.9 | 11 | 3.98 | 37 |
| | 4.0 | 16 | 5.67 | 75½ |
| | 8.1 | 18½ | 6.20 | 100 |
| Ground Sesame Seeds | 0 | 4 | 1.00 | 3 |
| | 0.9 | 5¼ | 1.13 | 3 |
| | 1.7 | 7¾ | 1.13 | 3¼ |
| | 4.0 | 10½ | 1.13 | 7½ |
| | 6.8 | 13 | 1.13 | 10½ |
| Uncrushed Sesame Seeds | 0 | 4 | 1.00 | 3 |
| | 6.2 | 4½ | 1.22 | 22 |
| Coarsely Ground Soy Beans. | 0 | 4 | 1.00 | 3 |
| | 1.6 | 7¼ | 1.93 | 15¼ |
| | 3.2 | 12 | 3.93 | 15¼ |
| | 7.5 | 12½ | 4.35 | 26½ |
| | 100 | 4¾ | 25.4 | |

As indicated hereinbefore the vegetable seeds were coarsely ground, except for one run which was made with uncrushed sesame seed, and it was found that the uncrushed sesame seed did not increase the stability of the mixed shortening, but did increase the stability of the dry rendered tankage. The results in the above table are set forth in the graphs attached hereto.

FIGURE 1 shows the increased stability of the mixed fat and oil with an increase in the oil content, and it is noted, that the uncrushed sesame seed is without effect; that the crushed soy bean rises rather rapidly, but reaches a maximum at about 4% oil, which has a stability of 12 hours, or approximately three times that of the fat alone, which has a stability of 4 hours. Soy bean oil has a stability of 4¾ hours. Therefore, it is not to be expected that a mixture of soy bean oil and lard would have an increased stability of from 4¾ hours by the incorporation of comparatively small amounts of soy bean oil to the animal fat by a simultaneous rendering process which greatly increases the stability of the mixed fat and oil product. The coarsely ground cotton seed gives by far the best results and rises to a maximum of 18 hours and 8% concentration of the oil.

The graph also shows that when the oil is 4% the stability is approximately 16 hours or approximately four times that of the fat alone.

The color of the mixed fat is shown in FIG. 2 and shows that the sesame seed, crushed or uncrushed, is without effect on the color of the animal fat. It also shows that the cotton seed increases the color and that the addition of soy bean seed produces a product having a color between that of cotton seed and sesame seed.

FIG. 3 shows the stability of dry rendered tankage. The dry rendered tankage removed from the process shows a most pronounced increase in stability. The dry rendered tankage removed from lard alone has a stability of 3 hours under the conditions of the test as applied in these experiments, as set forth above. The incorporation of cotton seed in an amount to give a 4% mixed oil, fat, has a dry rendered tankage stability of 75½ hours. This is 25 times the stability of the unmixed dry rendered tankage obtained from animal fat alone.

This material is sold as an animal food supplement and is sold on the basis of its protein content. The products obtained by this method have a protein content that varies little from the dry rendered tankage obtained from animal fats, and its greatly increased stability will give an improved product based on this factor alone.

It has been found that simultaneous rendering of oil bearing seeds, such as cotton seed, sesame seed and soy beans with a fatty material produces a product of improved properties when the oil bearing material contributes 1 to 8% of the oil in the finished product.

It has been found that cotton seed gives the best stability both as to mixed shortening and to the mixed dry rendered tankage. The preferred embodiment of this invention contemplates the use of 3% to 4% vegetable oil content which would correspond to the inflection point on the curve.

The coloring of the mixed fats is increased but the product does not acquire an objectionable color. The dry rendered tankage is greatly increased in stability and therefore represents a superior product.

The shortening as produced is light in color, giving an unexpected result, as normally when vegetable oils are used the product is usually very yellow and requires special refining. It is low in free fatty acid, 0.3%, whereas it would be expected to be in the neighborhood of 1%, if the result was a simple combination of 0.25% of free fatty acid, normally present in fresh lard with 2.5% free fatty acid, normally found in crude soy bean oil. The product has a high stability against rancidity over three times what is expected from lard, that is over 15 hours oxygen bomb method, as compared with the normal 4 hours of stability of lard. The refining loss of such a combined product is very low, thereby producing a higher yield.

A rancidity test for susceptibility for rancidity, wherein the protein material is incorporated in an oven at 60° C., showed that the present mixed shortening product was free of rancidity after three days. Dry rendered tankage from hog fat was clearly rancid overnight. A mixture of commercial soy bean meal and meat dry rendered tankage does not show any improvement in susceptibility to rancidity over plain meat dry rendered tankage. The soy bean meal is normally stable, but it does not impart its stability to meat dry rendered tankage by admixture therewith.

The surprising result obtained from the solids removed from the simultaneous rendering of meat fat and vegetable oil seed gives a product that is very stable and not susceptible to rancidity, a result that cannot be accounted for by any heretofore known process.

The process has many advantages over the rendering of meat fats alone. It is quite common in rendering meat fats to have a coating of protein form on the heated surface of the cooker. This interferes with the efficient heat transfer and prolongs the heating cycle necessary to obtain the separation of the fat to two or three times the normal time. It has been found that with the simultaneous cooking of vegetable oil seeds with animal fats, no coating of a protein material was formed on the cooker, so that the rendering operation was more efficient than in rendering meat fat alone, such as beef fat and mutton fat as well as hog fat.

While in accordance with the provisions of the statutes, there have been illustrated and described the best form of embodiment of this invention now known, it will be apparent to those skilled in the art that changes may be made in the form of the process disclosed without departing from the spirit of this invention as set forth in the foregoing description and in the annexed claims, and that in some cases certain features of this invention may be used to advantage without a corresponding use of other features.

What is claimed is:

1. A process for the simultaneous rendering of animal fat containing tissue and oil bearing seeds which comprises; adding ground oil bearing seeds to unrendered fat and rendering the mixture by heat to yield easily separated dry rendered tankage, and a mixed shortening stock containing from 1 to 8% oil, and separating the dry rendered tankage from the mixed shortening stock.

2. A process for the simultaneous rendering of animal fat containing tissue and oil bearing seeds which comprises; adding ground oil bearing seeds to unrendered fat and rendering the mixture by heat to yield easily separated dry rendered tankage having a moisture content of 6% to 12%, and a mixed shortening stock containing from 1 to 8% oil, and separating the dry rendered tankage from the mixed shortening stock.

3. A process for the simultaneous rendering of animal fat containing tissue and oil bearing seeds to obtain a mixed product containing 1% to 8% vegetable oil, which comprises; adding ground oil bearing seeds to unrendered fat and rendering the mixture by heat to yield easily separated dry rendered tankage, and a mixed shortening stock, and separating the dry rendered tankage from the mixed shortening stock.

4. A process for the simultaneous rendering of animal fat containing tissue and oil bearing seeds to obtain a product which contains approximately 4% oil and approximately 96% animal fat which comprises; adding ground oil bearing seeds to unrendered fat and rendering the mixture by heat to yield easily separated dry rendered tankage, and a mixed shortening stock, and separating the dry rendered tankage from the mixed shortening stock.

5. A process for the simultaneous rendering of animal fat containing tissue and soy bean seeds to obtain a mixed shortening containing from 1 to 7½% soy oil which comprises; adding an amount of ground soy bean seeds to unrendered fat and rendering the same by heat to yield easily separated dry rendered tankage, and a mixed shortening stock, and separating the dry rendered tankage from the mixed shortening stock.

6. A process for the simultaneous rendering of animal fat containing tissue and sesame seeds to produce a mixed shortening containing from 1% to 7% sesame oil, which comprises; adding ground sesame seed to unrendered fat and rendering the mixture by heat to yield easily separated dry rendered tankage, and a mixed shortening stock, and separating the dry rendered tankage from the mixed shortening stock.

7. A process for the simultaneous rendering of animal fat containing tissue and cotton seed to produce a mixed shortening containing from 1% to 8% cotton seed oil, which comprises; adding ground cotton seed to unrendered fat and rendering the mixture by heat to yield easily separated dry rendered tankage, and a mixed shortening stock, and separating the dry rendered tankage from the mixed shortening stock.

References Cited by the Examiner

UNITED STATES PATENTS

| | | | |
|---|---|---|---|
| 2,026,697 | 1/36 | Musher | 99—150 |
| 2,060,587 | 11/36 | Newton et al. | 99—118 X |
| 2,697,113 | 12/54 | Kramer | 260—412.6 |

OTHER REFERENCES

Dungan et al.: "Stabilization During Rendering," Circular No. 18, November 1955, American Meat Institute Foundation.

A. LOUIS MONACELL, *Primary Examiner.*

TOBIAS E. LEVOW, *Examiner.*